Figure 1:
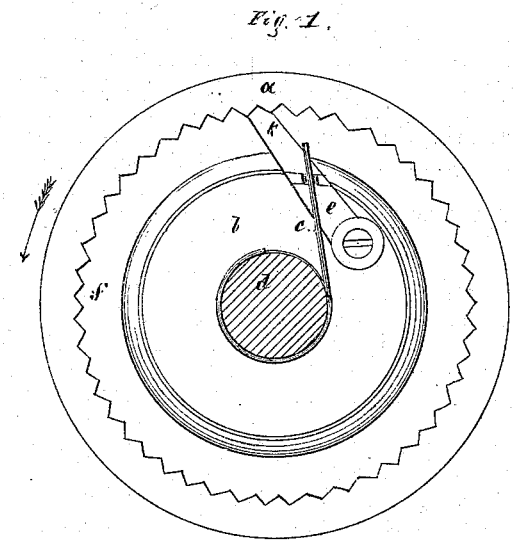

A. M. HILLS.

Improvement in Pawl and Ratchet Device.

No. 125,391.  Patented April 9, 1872.

Witnesses.  Inventor.
Amariah M. Hills 125,391

UNITED STATES PATENT OFFICE.

AMARIAH M. HILLS, OF EAST HARTFORD, CONNECTICUT.

IMPROVEMENT IN PAWL-AND-RATCHET DEVICES.

Specification forming part of Letters Patent No. 125,391, dated April 9, 1872.

*To all whom it may concern:*

Be it known that I, AMARIAH M. HILLS, of East Hartford, county of Hartford and State of Connecticut, have invented certain new and useful Improvements in Pawl-and-Ratchet Device; and to enable others skilled in the art to make and use the same I will proceed to describe it, referring to the drawing, in which the same letters indicate like parts in each of the figures.

This invention consists of a shaft having a disk, arm, or wheel rigidly attached to it, to which a pawl is connected by a screw, stud, or other connection, allowing the pawl to swing freely. On the shaft is fitted loosely a ratchet-wheel having teeth on its inner periphery and a hub in a line with the teeth, having a groove turned on the outer periphery of the hub for a spring to slide in.

Figure 2:
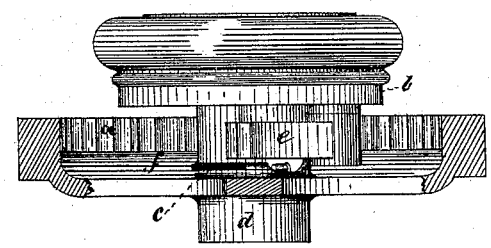

In the accompanying drawing, Figure 1 is a sectional view cut through the ratchet-wheel $a$ and its $\Lambda$-shaped teeth, with a wheel or disk, $b$, to which the pawl $e$ is arranged; also showing a friction-plate or wire spring, $c$, fitted closely to the shaft or hub of a wheel, $d$, and to the pawl $e$. Fig. 2 is a side view, having a portion of the $\Lambda$-shaped ratchet and rim of the wheel cut away to show more perfectly its operation.

One end of this spring $c$ is bent nearly into the form of a circle to clasp onto the hub $d$ of the ratchet-wheel $a$, or onto the shaft in case that the disk or wheel $b$ is fitted loosely and the ratchet-wheel $a$ rigidly to the shaft. The other end of the spring $c$ projects from the hub or shaft $d$, and works between projections or in guides on the pawl $e$ to lift it from or force it into the teeth of the ratchet-wheel. This spring $c$ may also be made in a similar form, the circular part of which is made to press outwardly against an inner periphery or flange on the ratchet-wheel $a$; the object of which, in either case, is that the tension of the spring in contact with the ratchet-wheel, or shaft to which the ratchet-wheel may be confined, may cause sufficient friction or resistance to the sliding motion of the spring to lift the pawl out of or force it into the teeth of the ratchet.

When the shaft, with the disk, arm, or wheel to which the pawl $e$ is attached, revolves in one direction, the resistance of the outer end of the spring against the free end of the pawl forces it into the teeth of the ratchet, thereby carrying the ratchet-wheel with it. When the shaft and pawl revolve in the opposite direction the resistance of the outer end of the spring swings the free end of the pawl from the teeth of the ratchet-wheel, thereby allowing the shaft, pawl, and spring to revolve, while the ratchet-wheel remains stationary.

This mode of operation is free from noise, and prevents the wearing out of the pawl and ratchet teeth, making a very simple, cheap, durable, and effective device.

What I claim, therefore, and desire to secure by Letters Patent, is—

The combination of the ratchet $a$, pawl $k$, and spring $c$, constructed and operating substantially as and for the purpose set forth.

AMARIAH M. HILLS. [L. S.]

Witnesses:
E. W. BLISS.
J. W. BLISS.